Nov. 11, 1924.
W. H. KADESCH
1,515,054
POWER TRANSMITTING DEVICE
Filed Oct. 27, 1923
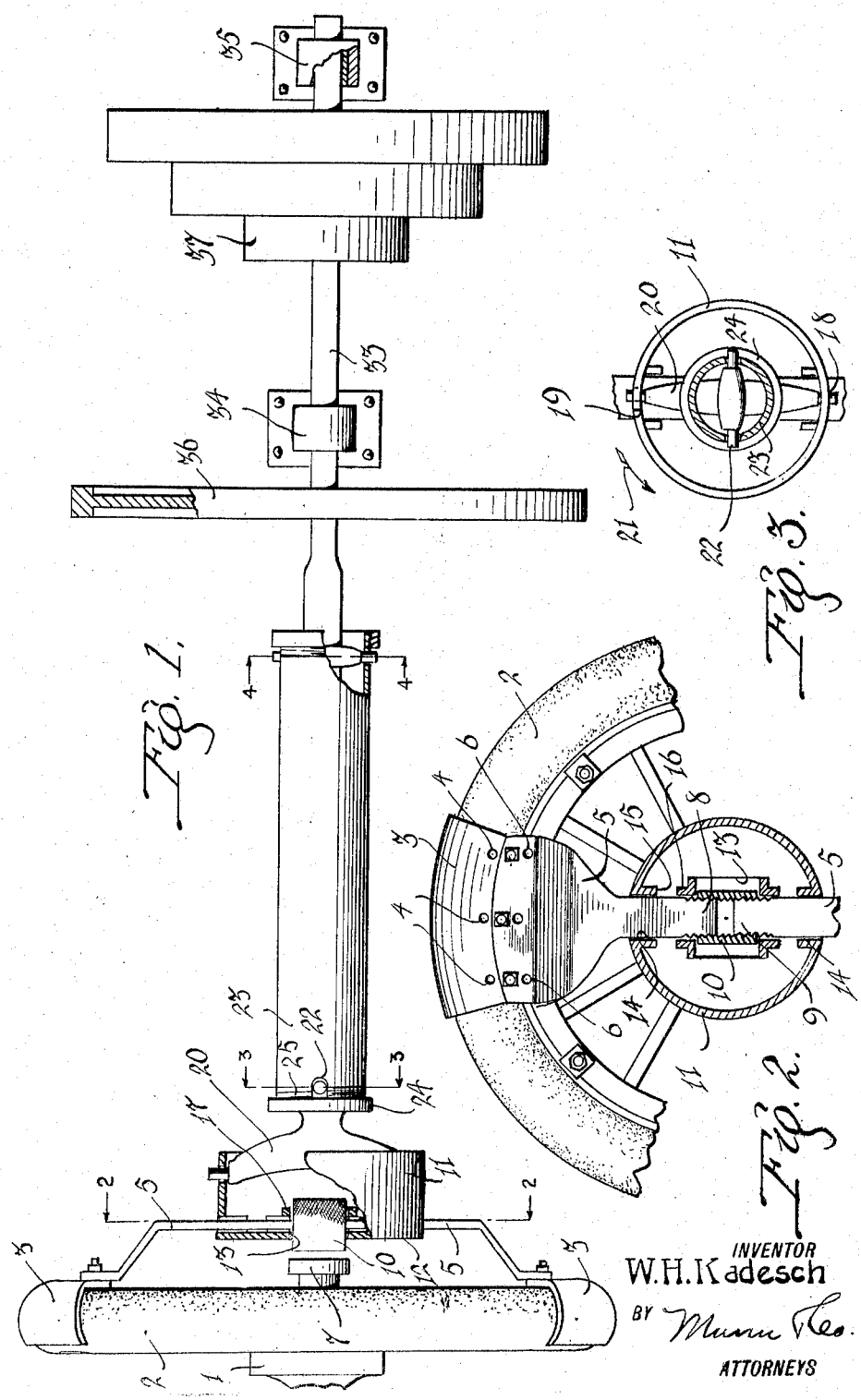
INVENTOR
W.H.Kadesch
BY
ATTORNEYS Patented Nov. 11, 1924.

1,515,054

UNITED STATES PATENT OFFICE.

WILLIAM H. KADESCH, OF CEDAR FALLS, IOWA.

POWER-TRANSMITTING DEVICE.

Application filed October 27, 1923. Serial No. 671,155.

*To all whom it may concern:*

Be it known that I, WILLIAM H. KADESCH, a citizen of the United States, and a resident of Cedar Falls, in the county of Blackhawk and State of Iowa, have invented a new and useful Improvement in Power-Transmitting Devices, of which the following is a full, clear, and exact description.

My invention relates to improvements in power transmitting devices, more particularly to that type of device by means of which power may be transmitted from the wheel of a motor vehicle to the drive shaft for operating machinery or the like.

An object of my invention is to provide a device of the character described which is readily adaptable to various sizes of motor vehicle wheels regardless of whether the wheels are of artillery, disc, or wire construction.

A further object of my invention is to provide a device of the type described which may be easily and quickly attached and adjusted in operative position on the ordinary type of motor vehicle wheel, the wheel first being jacked off from the ground.

A further object of my invention is to provide a device of the type described that is highly efficient mechanically, and thereby capable of transmitting a maximum amount of power from the motor vehicle to the machinery which is to be operated thereby.

A further object of my invention is to provide a device of the type described in which means is provided for automatically centering the rotating parts thereof relative to the motor vehicle, thereby precluding vibration of the parts.

A further object of my invention is to provide a device of the type described which is simple in construction and is thoroughly practical commercially.

Other objects and advantages will appear in the following specification, and the novel features of the invention will be particularly pointed out in the appended claims.

My invention is illustrated in the accompanying drawings forming part of this application, in which—

Figure 1 is a side elevation of an embodiment of my invention partially in section, Figure 2 is an enlarged sectional view along the line 2—2 of Figure 1, and Figure 3 is a sectional view along the line 3—3 of Figure 1.

In carrying out my invention I make use of the ordinary type of motor vehicle having a wheel 1 operatively connected to the propeller shaft (not shown) of the motor vehicle. The wheel 1 is provided with a vehicle tire 2 of ordinary construction.

Means for mechanically gripping the tire 2 of the wheel 1 so that power may be transmitted therefrom consists in a pair of gripping members 3 having the contour of the tread portion of the tire 2 (see Figure 2). These gripping members 3 are each provided with spaced apart openings 4 arranged in pairs and disposed through the lower portion of the gripping members 3.

Each of the gripping members 3 is provided with a plate 5 having spaced apart openings 6 therethrough arranged in pairs so that certain of the openings 6 may be placed in registration with certain of the openings 4 in such a manner as to permit the longitudinal adjustment of the plates 5 relative to the gripping members 3. The general contour of the plates 5 is clearly illustrated in Figure 1. It will be noted that the plates 5 are bent laterally so that their lower ends may clear the protruding portion of the hub 7 of the wheel 1.

The plates 5 are further provided with threaded portions 8 and 9 respectively at the lower ends. The threaded portion 8 is possessed of a right hand thread, while the portion 9 of the remaining plate is possessed of a left hand thread.

An interiorly threaded tubular sleeve 10 having right and left hand threads arranged to receive the threaded portions 8 and 9 of the plates 5 respectively so that the rotation of the tubular member 10 may occasion the movement of the plates 5 to and away from each other depending upon the direction of rotation of the sleeve 10.

A metal drum 11 closed at one end 12 is arranged to encompass the lower portions of the plate 5 including the threaded portions 8 and 9 and the sleeve 10. An opening 13 in the end wall 12 of the plate permits the sleeve 10 to protrude beyond the rear wall of the drum 11 so that it may be manually rotated, thereby adjusting the plates 5 from a point exterior of the drum.

In reference to Figure 2 it will be noted that openings 14 are disposed through the peripheral wall of the drum 11 so that the portions 8 and 9 of the plates 5 respectively may be admitted thereto. In making these openings 14, a portion 15 of the side wall of the drum is bent inwardly and welded to the rear portion of the drum, thereby reenforcing the wall at this point. Likewise, the opening 13 through the rear wall 12 of the drum is provided by pressing back a punched out portion of the rear wall and welding this portion 16 to the rear wall of the drum, thereby reenforcing the wall adjacent the opening 13.

A slideway 17 is formed of the portion of the wall 12 of the drum that is pressed out in forming the opening 13 which permits the parts 8 and 9 of the plates 5 respectively to pass therethrough and which limits the lateral movement of these portions of the plate (see Figures 1 and 2). The drum 11 is provided with an opening through its side wall at 18 (see Figure 3) and an L-shaped recess 19 diametrically opposed the opening 18 through the opposite side wall of the drum 11. A member 20 having the shape of a double trunnion, one disposed at right angles to the other and constructed after the fashion of the ordinary gimbal mounting, has trunnions rotatably mounted in the opening 18 and recess 19 of the drum 11. It should be noted that the direction of rotation of the drum 11 is in the direction of the arrow 21. If the direction of rotation is in the opposite direction, then the recess 19 must be reversed.

The remaining trunnion of the member 20 is rotatably mounted in a pair of aligned recesses 22 provided in one end of the tubular shaft 23 (see Figure 1).

An interiorly threaded collar 24 secured upon threads 25 in the exterior wall of the member 23 serves to prevent dislodgment of the member 20 from the recesses 22. It will be noted that I have established a universal joint between the drum 11 and the shaft 23 by the use of the member 20.

The opposite end of the tubular member 23 is connected with a shaft 33 which is rotatably supported in stationary bearings 34 and 35.

A fly-wheel 36 is disposed upon the shaft 33 intermediate the bearings 34 and the flattened portion 32 of the shaft. A drive pulley 37 is carried upon the shaft 33 between the bearing members 34 and 35 so that a belt may be driven by the pulley 37 and in turn drive machinery placed adjacent thereto, such as the ordinary type of farm machinery of stationary nature.

From the foregoing description of the various parts of the device, the operation thereof may be readily understood. In applying my improved transmission device to the motor vehicle of the ordinary type, it is first necessary to jack one of the rear wheels or drive wheels of the vehicle from the ground so that the wheel may be turned by the power plant carried as a part of the vehicle. The next step in applying my improved transmission is to rotate the sleeve 10 so that the plates 5 move apart from one another, thereby permitting the gripping members 3 to encompass the tread portion of the vehicle tire 2. The tubular member 10 is then turned so that the plates are drawn toward one another and the gripping members 3 drawn into tight engagement with the vehicle tire and the device is ready for use. It will be noted that movement of the plates 5 to and away from each other is uniform with respect to the drum 11 and therefore the drum 11 is at all times on the same axis with the wheel 1.

A belt may be engaged with the pulley wheel 37 and with some machine disposed nearby and rotation of the pulley wheel will cause movement of the belt so that the machine may be driven.

In taking down my improved power transmission device, the shaft 23 may be quickly removed from engagement with the member 20 by merely releasing the collar 24, thus making the device easy to pack away or store until needed again.

It should be noted that while I have described one particular embodiment of my invention, that obviously any modifications of the particular structure of the device may be made without departing from the spirit and scope of my invention as set forth in the appended claims.

I claim:

1. A device of the type described comprising a pair of cooperating clamping plates having substantially the contour of the tread portion of a vehicle wheel, of means for drawing said clamping plates into close engagement with the tread of said wheel, a universal joint having one of its cooperating members attached with said plates, a shaft connected with the remaining member of said universal joint, and means associated with said shaft arranged for driving engagement with stationary machinery or the like.

2. A device of the type described comprising a pair of cooperating clamping members having substantially the contour of the tread portion of a vehicle wheel and arranged to engage with the tread portion of a vehicle wheel, means for drawing said clamping members into close engagement with the tread of said wheel, and a universal joint having one part of its cooperating members attached to said clamping members and having its axis concentric with the axis of said vehicle wheel when said clamping members are drawn into close engagement therewith.

WILLIAM H. KADESCH.